(12) United States Patent
Zellweger (10) Patent No.: US 8,534,314 B2
(45) Date of Patent: Sep. 17, 2013

(54) EXPLOSION PROTECTION VALVE

(75) Inventor: Jurg Zellweger, Waldstatt (CH)

(73) Assignee: Rico-Sicherheitstechnik AG, Herisau (CH)

( * ) Notice: Subject to any disclaimer, the term of this patent is extended or adjusted under 35 U.S.C. 154(b) by 1462 days.

(21) Appl. No.: 11/919,241

(22) PCT Filed: Apr. 5, 2006

(86) PCT No.: PCT/EP2006/061339
§ 371 (c)(1),
(2), (4) Date: Oct. 25, 2007

(87) PCT Pub. No.: WO2006/120091
PCT Pub. Date: Nov. 16, 2006

(65) Prior Publication Data
US 2010/0218963 A1    Sep. 2, 2010

(30) Foreign Application Priority Data

May 9, 2005    (CH) ...................................... 0815/05

(51) Int. Cl.
*F16K 31/12*    (2006.01)

(52) U.S. Cl.
USPC ............ 137/498; 137/460; 137/493; 251/337

(58) Field of Classification Search
USPC ............... 137/460, 493, 498, 505.14, 513, 137/516.25, 517, 524, 529; 251/337
See application file for complete search history.

(56) References Cited

U.S. PATENT DOCUMENTS

| | | | |
|---|---|---|---|
| 1,308,165 A * | 7/1919 | Clark ............................. | 137/529 |
| 1,519,856 A * | 12/1924 | Lorraine ........................ | 137/529 |
| 2,742,921 A * | 4/1956 | Dove et al. ................ | 137/516.27 |
| 3,568,711 A * | 3/1971 | Katz ........................ | 137/516.11 |
| 3,862,751 A * | 1/1975 | Schwaller ........................ | 267/91 |
| 4,171,712 A * | 10/1979 | DeForrest ................... | 137/513.5 |
| 4,420,141 A * | 12/1983 | Goloff ............................ | 251/337 |
| 4,485,843 A * | 12/1984 | Wolff .............................. | 137/514 |
| 5,174,332 A * | 12/1992 | Yokoyama et al. ........... | 137/517 |
| 5,251,655 A * | 10/1993 | Low ............................... | 137/501 |
| 5,280,131 A * | 1/1994 | Sarro ........................... | 174/15.6 |

FOREIGN PATENT DOCUMENTS

| | | |
|---|---|---|
| CH | 694 303 A5 | 11/2004 |
| FR | 1.302.543 | 1/1963 |
| GB | 672340 | 5/1952 |
| GB | 1 260 541 | 1/1972 |
| JP | 53-99528 | 8/1978 |
| WO | WO 2004/048828 A1 | 6/2004 |

* cited by examiner

*Primary Examiner* — John Fox
*Assistant Examiner* — Kevin Murphy
(74) *Attorney, Agent, or Firm* — Nath, Goldberg & Meyer; Jerald L. Meyer; Stanley N. Protigal (57) ABSTRACT

Disclosed is an explosion protection valve comprising a closing member (4) which is movable inside a housing (2), is guided along a guide bar (3), and can be displaced in a moving direction from a predefined open position into a sealing closed position in case of a shock wave or suction wave. The explosion protection valve further comprises a spring arrangement that is effectively connected to the closing member (4) in order to maintain the open position on the guide bar (3). Said spring arrangement is provided with a first spring element (5, 5') and a second spring element (6, 6') in relation to the respective moving direction. The spring elements are disposed such that the second spring element (6, 6') can be impinged upon only following a predetermined spring travel (a) when the closing member (4) is displaced into the closed position.

15 Claims, 8 Drawing Sheets

EXPLOSION PROTECTION VALVE

The invention relates to an explosion protection valve according to the preamble of claim 1. Such valves serve to prevent the propagation of a blast or suction wave in a pipeline. The valves are fitted, for example, in explosive-prone installations in delivery lines, in particular also in pneumatic delivery lines. However, explosion protection valves may also be used, for example, as blast wave protection for the fresh and spent air openings of shelters or military buildings. Such valves have as a rule a closing body which is held during normal operating pressure in a neutral open position in which a gas or liquid flow flows around it. This is effected by means of springs. Such valves often act on two sides, i.e. they close off the pipeline no matter on which side of the valve the blast or suction wave occurs.

DE-A-28 01 950, for example, describes a comparable generic explosion protection valve. The valve has a symmetrically designed housing in which a closing body is held. The closing body is guided on a guide rod and can be displaced against the force of a spring arrangement from a predefined open position in two directions of movement into a sealing closed position in the event of a blast or suction wave. To this end, the valve has two spring elements, in each case one spring element being arranged laterally on the guide rod. Even at low pressure fluctuations, the closing body starts to be displaced, as a result of which the valve cross section or the gap between closing body and closing body seal is made smaller and thus the pressure difference in the valve increases. If the closing body moves in the direction of the closed position, the force of the centring spring increases linearly, but the pressure increases exponentially due to the air flow onto the closing body. As soon as the force due to the air flow is greater than the force of the centring spring, the valve closes suddenly. It has been found in practice that such a valve characteristic can be unfavourable.

CH-A5-694 303 describes an explosion protection valve in which, after a preloading force has been overcome, a centrally arranged spring element is compressed during the displacement of the closing body. The spring arrangement may alternatively also consist of two spring elements arranged on the sides of the guide rod. After the preloading force is exceeded, this valve also has an unfavourable closing behaviour depending on the intended purpose.

It is therefore an object of the present invention to avoid the disadvantages of the known valve, in particular to provide an explosion protection valve of the type mentioned at the beginning, which is distinguished by a better closing behaviour. In particular, the valve behaviour is to be optimized within the range of the suddenly occurring closing movement. Furthermore, the explosion protection valve is to be capable of being produced in a simple manner. This object is achieved according to the invention by an explosion protection valve which has the features in claim 1.

An optimized closing behaviour of the valve is achieved by the two-stage spring arrangement. The use of the second spring element prevents premature sudden closing of the valve. The spring arrangement is in this case designed in such a way that the second spring element is not compressed or acted upon in another way within the predetermined spring travel. In the event of an explosion, the closing body can have a certain speed at the instant the predetermined spring travel is exceeded. Due to the kinetic energy of the closing body, the second spring element is now compressed. Depending on the selected strength of the second spring element, the valve can be closed earlier or later. The first spring element may in this case be designed in such a way that the closing body assumes its predefined open position again, for example, after the air flow is shut off. The closing body can be locked in the closed position by means of a locking device. Such locking devices are known, for example, from CH-A5-694 303. It is of course conceivable to provide an explosion protection valve with a three-stage or multi-stage spring characteristic within the scope of the present invention. Alternatively, however, it is also conceivable to provide a spring arrangement with a stepless characteristic. In this case, a conical spring, for example, could be provided.

In a first embodiment, the explosion protection valve can have at least one first driver element and at least one second driver element for acting upon the first and the second spring element, respectively. In this case, the closing body can be displaceably arranged on the guide rod in such a way that only the first spring element can be acted upon via the first driver element within the predetermined spring travel. As soon as the predetermined spring travel is exceeded, the second spring element can be additionally acted upon via the second driver element. Forces can thus be transmitted to the spring elements in a simple manner by means of driver elements.

The first driver element and the second driver element can be arranged on the inside of a carrier tube, surrounding the guide rod, for the closing body. Driver elements may be designed, for example, as retaining rings or may have retaining rings. Said carrier tube may be displaceably mounted on the guide rod on sliding bearings. The spring elements are therefore advantageously designed as centring springs in the annular gap between the outside of the guide rod and the inside of the carrier tube and are thus screened from the delivery medium.

The explosion protection valve may be designed as a valve acting on two sides. To this end, it may have a closing body displaceable in two directions of movement, wherein, to displace the closing body in two directions of movement, a first driver element and a second driver element may be provided. In this case, with respect to one of the directions of movement, a first spring element assigned to this direction of movement can be capable of being acted upon via the first driver element and a second spring element can be capable of being acted upon via the second driver element. In the opposite direction to said direction of movement, a first spring element assigned to the opposite direction can be capable of being acted upon via the (said) second driver element. The driver elements can therefore be used for acting upon the spring elements, in particular for compressing the spring elements, in both directions.

It is especially advantageous if the spring arrangement has a second spring element which is in operative connection with the closing body in each of the two directions of movement. In this case, the second spring element can be capable of being acted upon in one direction of movement via the first driver element and in the opposite direction via the second driver element. A two-stage spring arrangement therefore only needs three springs. Such a spring arrangement having three springs may be designed, for example, as follows: a respective first spring element may be arranged in the region of each side of the guide rod. A second spring element may be arranged between the two first spring elements, wherein said second spring element can preferably be arranged approximately centrally on the guide rod.

The second spring element acting on two sides can be held between two limiting means. It is especially advantageous if the limiting means for the second spring element are mounted on the guide rod in such a way as to be displaceable to a limited extent.

These limiting means may each have a bush mounted on the guide rod in such a way as to be displaceable to a limited extent. The bush can thus form a stop for the first driver element. If the predetermined spring travel is exceeded, the corresponding driver element abuts against the bush, as a result of which the second spring element can be compressed.

For the limited displacement of the limiting means, in particular for the abovementioned bush, at least one guide groove running in the direction of movement can be arranged on the guide rod, and pins connected to the bush engage in each case in said guide groove.

However, to displace the closing body in two directions of movement, two first driver elements having associated first spring elements and two second driver elements having associated second spring elements can also be provided. In this case, the respective first spring element can be capable of being acted upon via its first driver element or the respective second spring element can be capable of being acted upon via its second driver element in a direction of movement assigned to it. Such a spring arrangement can therefore consist of four springs. In this case, two respective spring elements can interact as a spring pair with the closing body only in one direction of movement each.

The spring arrangement may have two spring pairs, wherein one spring pair each having a first spring element and a second spring element is arranged for each direction of movement on one side of the guide rod.

It can be advantageous if at least the second spring element is held in a preloaded position by limiting means. Due to the preloading of the second spring element, a preloading force can be achieved which, after the predetermined spring travel is exceeded, first has to be overcome before a further displacement can take place at all in the direction towards the closed position. It is of course also conceivable, depending on the intended purpose, to also hold the first spring elements in a preloaded position between limiting means.

The spring elements of the spring arrangement may be designed as compression springs, in particular as helical compression springs. The springs may be made, for example, of metal, in particular of steel. Depending on the range of application, springs could also be made of rubber or a comparable material. Even hydraulic springs are conceivable.

The spring stiffness of the first spring element may be equal to, greater than or less than the spring stiffness of the second spring element.

Further individual features and advantages of the invention follow from the description below of the exemplary embodiments and from the drawings, in which:

Figure 1:
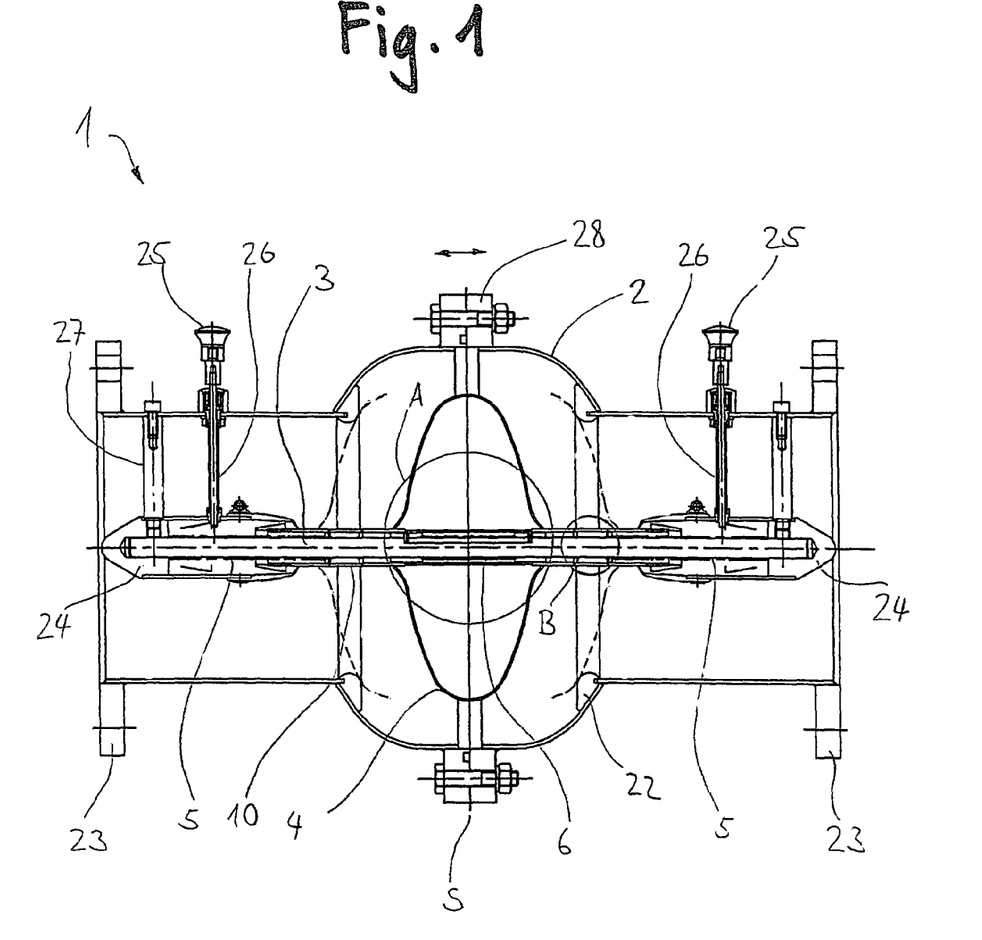
FIG. 1 shows a cross section through an explosion protection valve with a closing body in the open position.

As shown in FIG. 1, an explosion protection valve designated overall by 1 essentially comprises a housing 2 and a closing body 4 which is arranged in said housing 2 and is displaceably mounted on a guide rod 3. The housing consists of two roughly mirror-symmetrical housing halves which are releasably connected to one another via a flange connection 28. The valve can be integrated in a pipeline by means of the flanges 23.

The closing body 4 is designed as a rotationally symmetrical hollow body of roughly elliptical cross section. In the closed position, the closing body 4 would bear against the annular sealing elements 22 (the two closed positions are shown by a broken line in FIG. 1).

The guide rod 3 is fixed at both ends in a holding piece 24. The closing body 4 is not directly mounted on the guide rod 3, but rather indirectly via a carrier tube 10 which extends beyond the closing body 4 on both sides. Furthermore, locking devices 25 having lock bars 26 for holding the closing body in the closed position are provided. A mechanically locked valve is in this case designed in such a way that it can only be opened or unlocked manually. Such a locking device is known, for example, from CH-A5-694 333.

To hold the open position, a spring arrangement interacting with the closing body 4 is provided on the guide rod 3 in the gap space between the latter and the carrier tube 10. The spring arrangement according to FIG. 1 has three spring elements: two first spring elements 5 and 5' and a second element 6. The first spring elements arranged on the sides of the guide rod can each be compressed with respect to one direction of movement. In contrast, the second spring element 6 arranged in the centre can be compressed in both directions of movement (see arrow) and thus has a double function. The spring arrangement is in this case designed in such a way that, during a displacement of the closing body into the closed position, the second spring element 6 cannot be compressed until after a predetermined spring travel. It is of course conceivable for the spring elements to also be acted upon in another way. For example, the spring elements could be extended (as tension springs). The construction and the precise functioning of the spring arrangement of the valve 1 according to FIG. 1 is to be explained below with reference to FIGS. 2 to 5.

Figure 2:
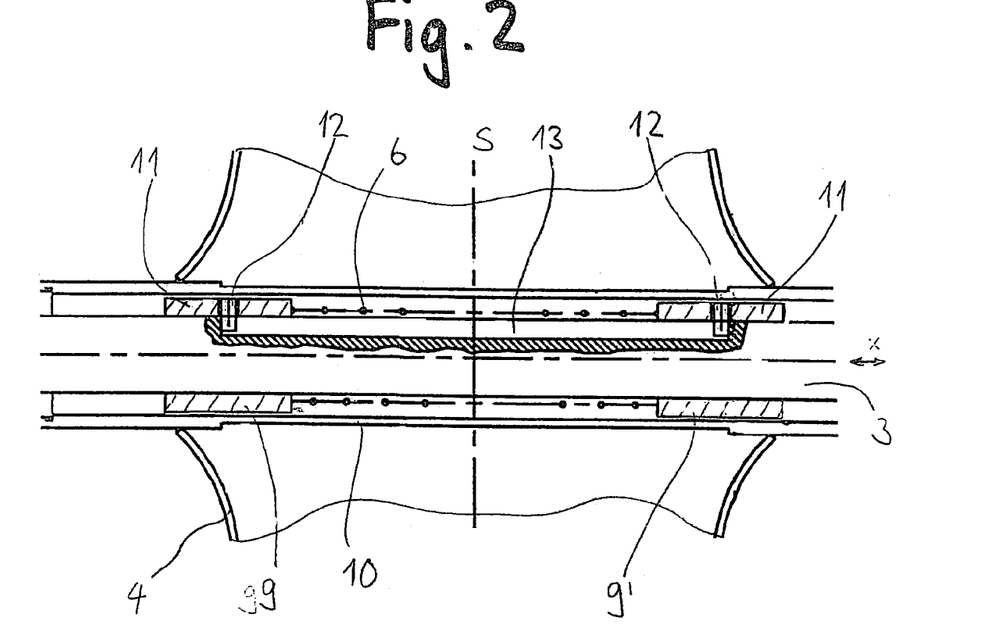
FIG. 2 shows the detail A according to FIG. 1.

As FIG. 2 shows, the centrally arranged spring, i.e. the second spring element 6, is arranged between two limiting means 9, 9'. The limiting means have bushes 11 which are mounted on the guide rod 3 and in such a way as to be displaceable thereon to a limited extent. To this end, a guide groove 13 is provided which runs in the direction of movement and in which pins 12 engage which are each connected to the respective bush 11. The pins 12 may be designed, for example, as headless set screws. The spring element 6 can be preloaded in a simple manner by the limiting means 9 and 9'. However, preloading is of course not absolutely necessary.

Figure 3:
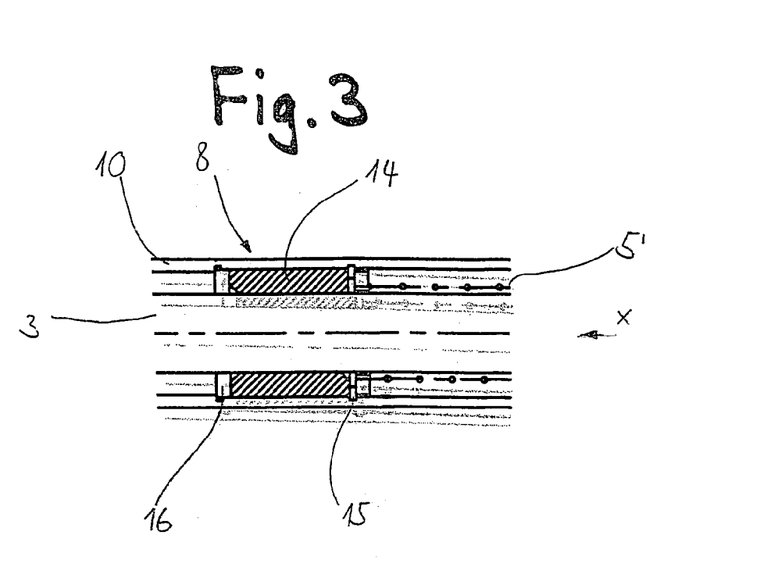
FIG. 3 shows the detail B according to FIG. 1.

FIG. 3 shows a driver element for applying a spring force to the spring elements. The driver element, designated by 8, is designed with respect to the arrow direction x (direction of movement) as a second driver element for the second spring element 6 (see FIG. 2 and following FIGS. 4*a*-4*c*). The driver element 8 has a retaining ring 15 fastened to the carrier tube 10. Adjoining the retaining ring 15 is a sliding bearing 14 for permitting the displacement of the guide rod 3. A distance ring 16 is then provided towards the centre, this distance ring 16 abutting against an encircling shoulder of the carrier tube 10. The other driver element 7 is constructed in the same way, but mirror inverted (cf. FIGS. 4*a*-4*c*).

Figure 4A:
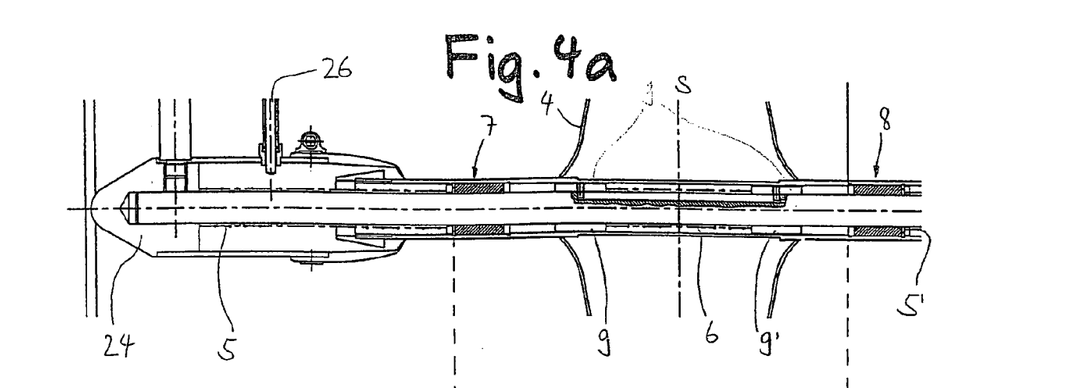
FIG. 4a shows an enlarged detail of the cross section of an explosion protection valve according to FIG. 1 with a closing body in open position.
Figure 4B:
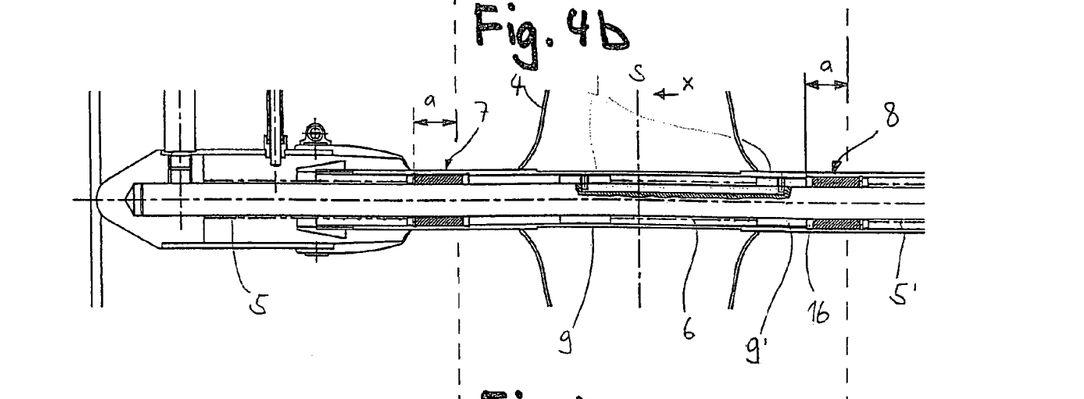
FIG. 4b shows the explosion protection valve according to FIG. 4a with a closing body displaced by a spring travel a, FIG. 4c shows the explosion protection valve according to FIG. 4a with a closing body displaced by a further distance.
Figure 4C:
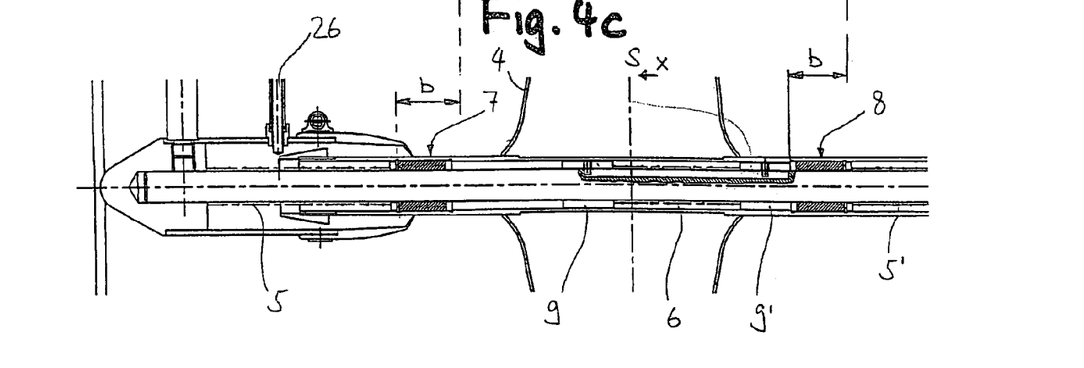

FIGS. 4*a*-4*c* show the closing body 4 in three different positions. In FIG. 4*a* the closing body 4 is located in its neutral position. During a gas or liquid flow in arrow direction x, the closing body 4 would move in this direction towards the closed position. In this case, first the first spring element 5 is compressed via the driver element 7. The second spring element 6 provided for the second stage is not acted upon within the spring travel a or within the displacement of the closing body 4 by a distance a. In FIG. 4*b* the closing body 4 is displaced in the x direction by a distance a. As can be seen from FIG. 4*b*, the driver element 8 abuts via the distance ring 16 (cf. FIG. 3). During a further displacement of the closing body 4 in the x direction, the second spring element 6 would now likewise be compressed. Such a position is shown in FIG. 4*c*. Here, on the one hand the first spring element 5 is compressed by the spring travel b and on the other hand the second spring element 6 is compressed by a distance (b–a).

Figure 5:
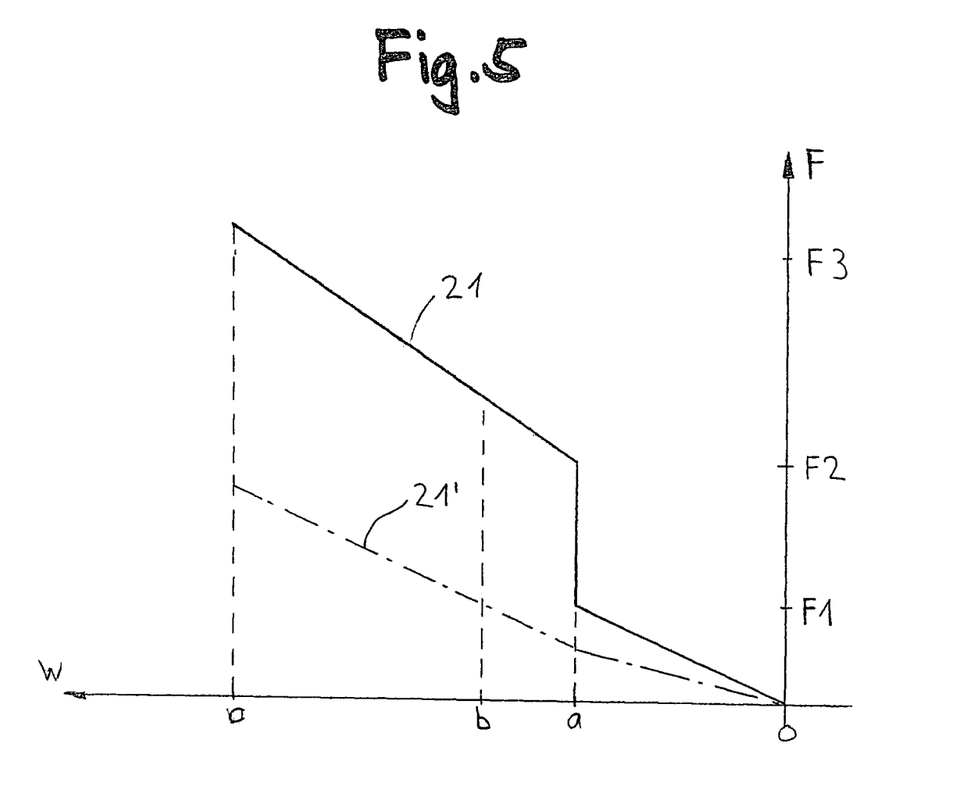
FIG. 5 shows a force/travel diagram for an explosion protection valve according to FIGS. 4a to 4c.

FIG. 5 shows a force/travel diagram for an explosion valve according to FIGS. 4*a*-4*c* (travel: w, force: F). From the open position 0 up to the spring travel a, the curve 21 runs linearly starting from zero (or from a certain value if preloaded) up to a spring force F1. From the spring travel a, the second spring element is now also acted upon in addition to the first spring element. If the spring travel or the distance a is exceeded, the curve 21 runs linearly from a spring force F2 up to the closed position (travel c) F3. As can be seen from FIG. 5, the second spring element 6 is preloaded. Therefore before a further spring travel, as a, can be covered, the preloading force (F2–F1) must be overcome. In the case of the curve characteristic 21', the second spring element would not be preloaded.

Figure 6:
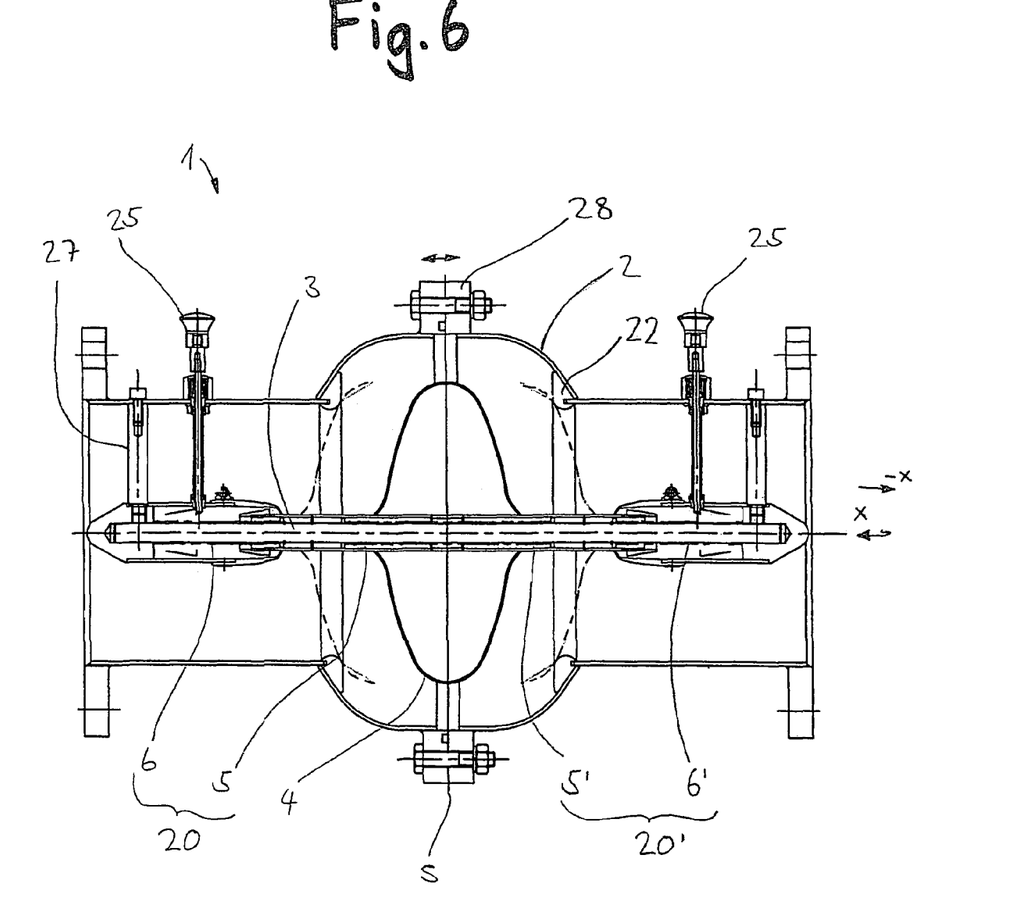
FIG. 6 shows a cross section through an alternative explosion protection valve with a closing body in open position.

Shown in FIG. 6 is an alternative exemplary embodiment of an explosion protection valve, the operating principle of which is, the same as in the exemplary embodiment according to FIG. 1. However, the explosion protection valve according to FIG. 6 has a different spring arrangement. To displace the closing body 4, two spring elements are provided for each direction of movement. This would be the spring elements 6 and 5 (spring pair 20) for the direction of movement x and the spring elements 5' and 6' (spring pair 20') in the opposite direction (arrow direction –x). The spring pairs 20 and 20' are in this case arranged on one side of the guide rod 3 with respect to the respective direction of movement (S: plane of symmetry). Details of the spring arrangement can be seen from FIGS. 7*a*-7*c* and 8*a*-8*c*.

Figure 7A:
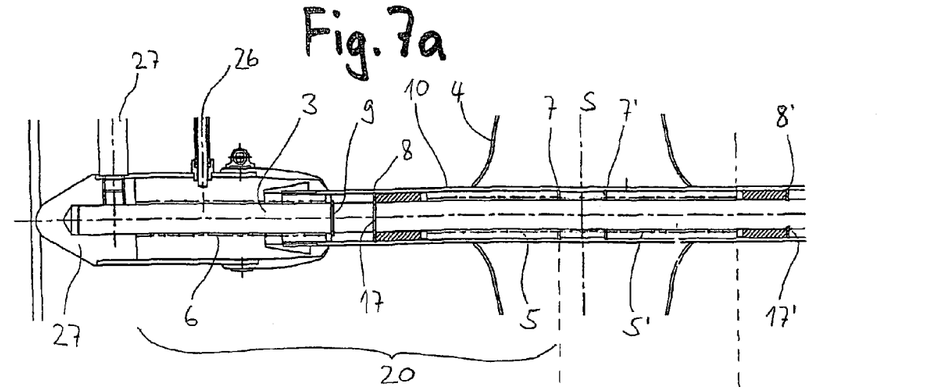
FIG. 7a shows a detail of the explosion protection valve according to FIG. 6 with a closing body in open position.
Figure 7B:
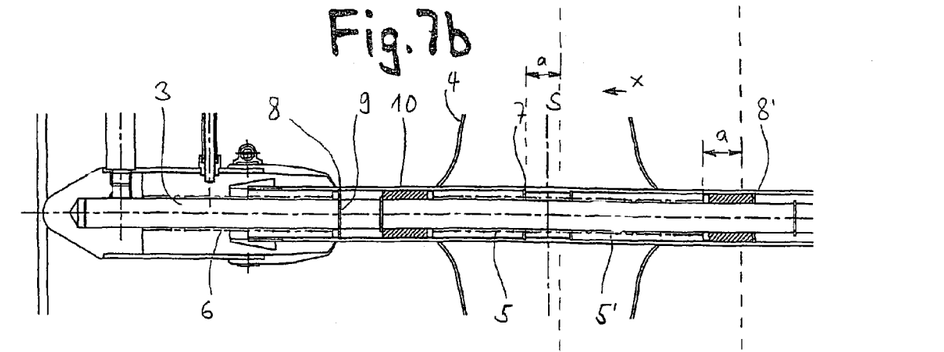
FIG. 7b shows the explosion protection valve according to FIG. 7a with a closing body displaced by a spring travel a, FIG. 7c shows the explosion protection valve according to FIG. 7a with a closing body displaced by a further distance.
Figure 7C:
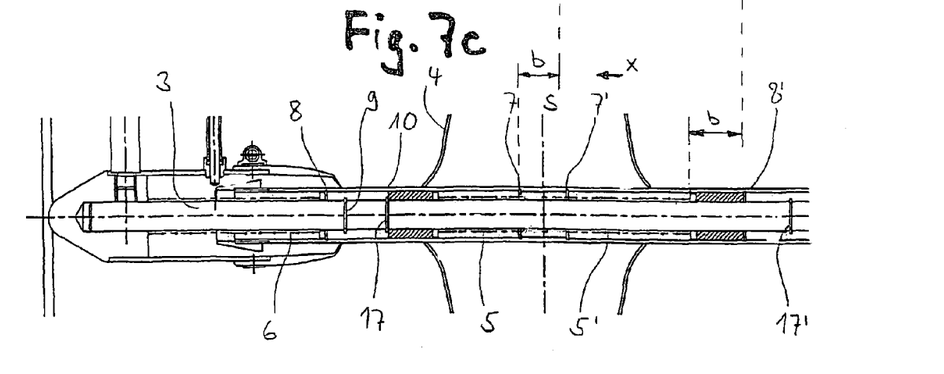

FIG. 7*a* shows the explosion protection valve in its neutral open position. With respect to the plane S of symmetry, a spring pair 20 contains a first spring element 5 arranged on the inside and a spring element 6 arranged on the outside. The spring elements 5, 6, 5' (and 6') are arranged in the hollow-cylindrical or annular gap space between guide rod 3 and carrier tube 10 (as in the previous exemplary embodiment). If the closing body 4 is now displaced in the x direction, only one spring element, the first spring element 5, is acted upon within a spring travel a (in the opposite direction this would be the first spring element 5'). The first spring element 5 is compressed via a first driver element 7, for example in the form of a retaining ring connected to the carrier tube 10. In the process, the second spring element 6 and the other spring elements are not acted upon. FIG. 7*b* shows the explosion protection valve with a closing body 4 displaced in the x direction by a distance a. In this position, the first spring element 5 is compressed by the spring travel a via the driver element 7. At the same time, the second driver element 8 for the spring element 6 has likewise been displaced in the x direction by the distance a. As can be seen, the second spring element can now also be compressed via the second driver 8 during a further displacement in the x direction. Such a position can be seen from FIG. 7*c*. Here, the closing body 4 is displaced in the x direction by a distance b, which is greater than a. As FIG. 7*c* shows, the second spring element 6 has been compressed by a spring travel (b–a) via the driver element 8. The first spring element 5 is compressed by the spring travel b.

Figure 8A:
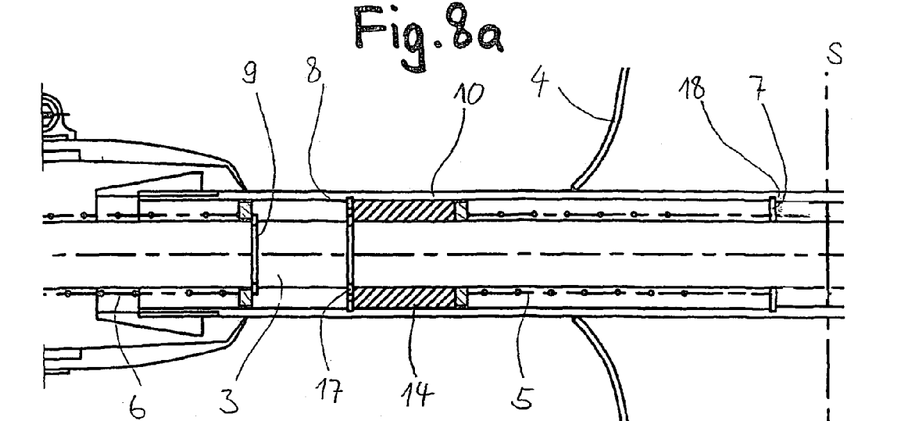
FIGS. 8a to 8c show enlarged illustrations of the cross section according to FIGS. 7a to 7c.
Figure 8B:
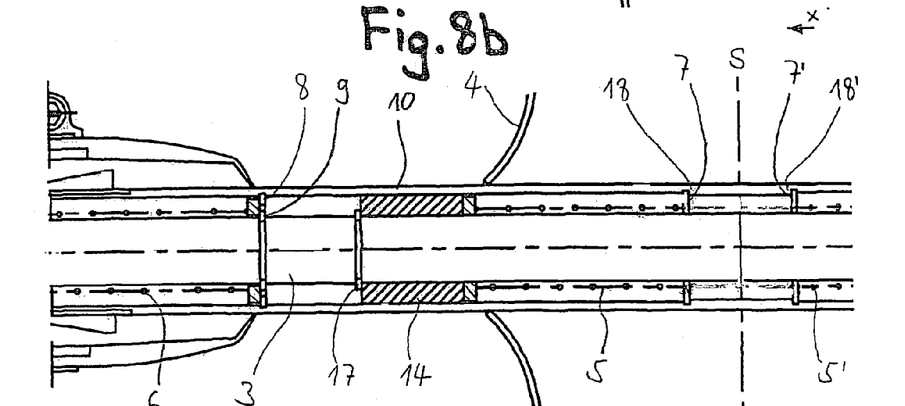
Figure 8C:
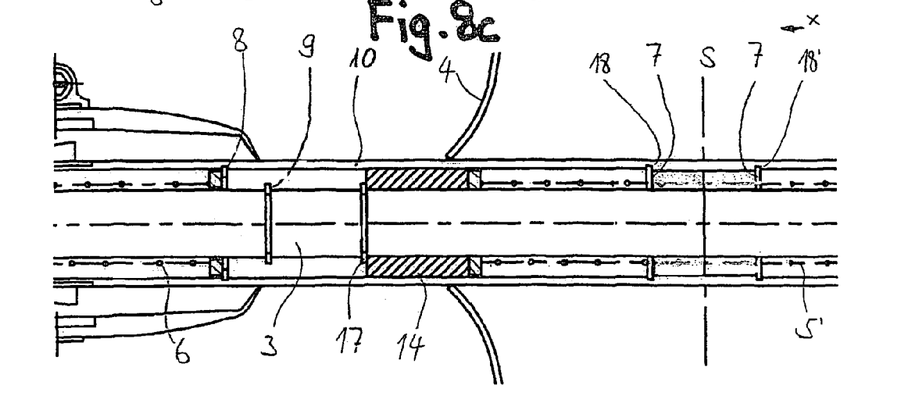

FIGS. 8*a*-8*c* show enlarged details of the preceding FIGS. 7*a*-7*c* (FIG. 8*a/b/c* corresponds to FIG. 7*a/b/c*). As can be seen from FIGS. 8*a*-8*c*, the first driver elements 7 and 7' are designed as annular elements. These rings are displaceably mounted on the guide rod 3 and are each positioned in a shoulder 18 or 18' of the carrier tube 10. In this way, the driver elements 7 and 7' can perform their driving function for producing an operative connection between closing body 4 and spring element 5 or 5', respectively. However, retaining rings firmly connected to the carrier tube 10 could also be provided as first driver elements 7 and 7'. The first spring element 5 is secured towards the outside by a limiting element 17. This limiting element 17 (or 17') may be designed as a retaining ring which is firmly connected to the guide rod 3. Adjoining the limiting element 17 is a sliding bearing 14 for the guide rod 3. The second spring element 6 is secured in the x direction by the limiting means 9. Therefore the second spring element 6 (and by analogy the second spring element 6' for the opposite direction) can be held in a preloaded position between the holding piece 24 and the limiting means 9. It is of course conceivable that the first spring element 5 (or 5') can also be preloaded. As can be seen from FIGS. 8*a*-8*c*, the retaining rings for the driver elements 8 (or 8') and for the limiting means 9 (or 9' and 17 or 17') are to be designed in such a way that no mutual impairment is possible. This can be seen in particular from FIGS. 8*a* and 8*b*: in the open position, the retaining ring for the limiting element 17 and the retaining ring for the second driver element 8 lie one on top of the other (FIG. 8*a*); after displacement in the x direction by the predetermined distance or spring travel a, the retaining rings for the limiting means 9 and for the second driver element 8 lie one on top of the other (FIG. 8*b*).

Figure 9A:
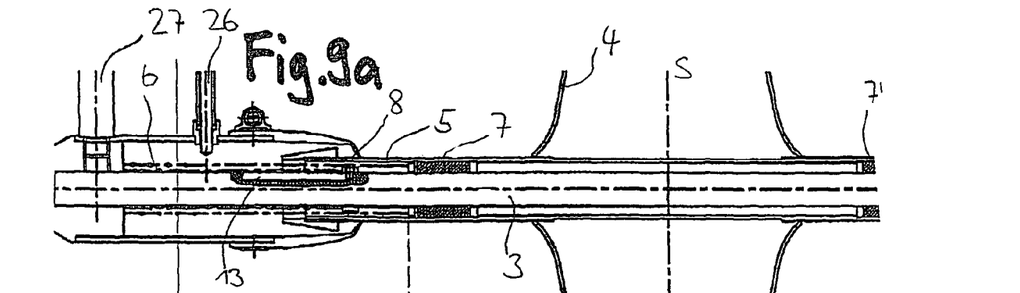
FIG. 9a shows a detail of a further explosion protection valve in open position in cross section.
Figure 9B:
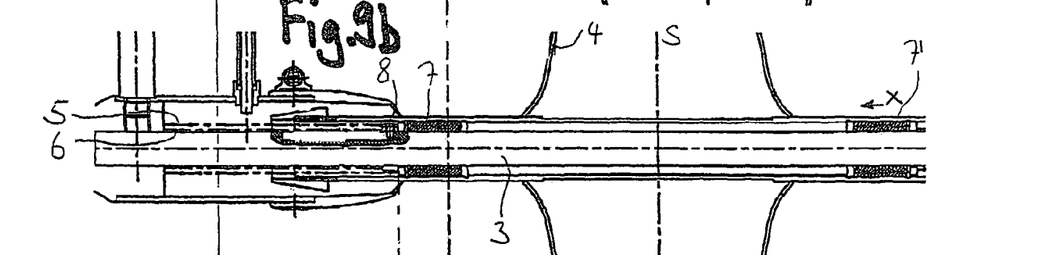
FIG. 9b shows the explosion protection valve according to FIG. 9a with a closing body displaced by a spring travel a, FIG. 9c shows the explosion protection valve according to FIG. 9a with a closing body displaced by a further distance b.
Figure 9C:
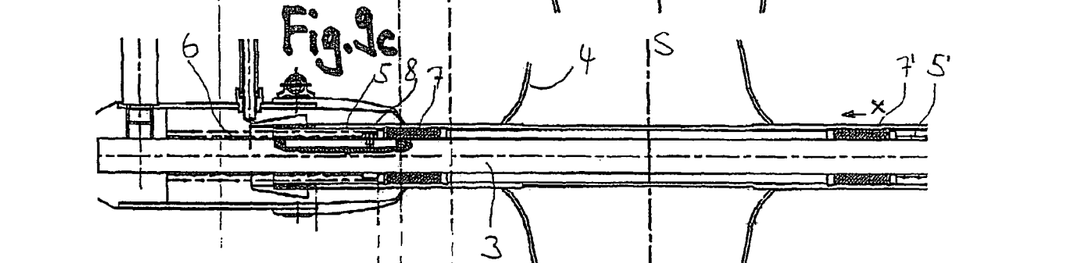
Figure 9D:
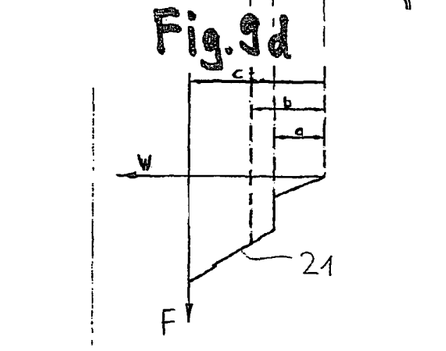
FIG. 9d shows a force/travel diagram for an explosion protection valve according to FIGS. 9a to 9c.

As FIGS. 9*a*-9*c* show, other constructional configurations are also conceivable without departing from the idea of the invention. Here, the spring arrangement of the explosion protection valve has in each case two spring elements of different length with respect to a direction of movement, said spring elements lying one on top of the other. In the open position according to FIG. 9*a*, the first spring element 5 is longer than the second spring element 6 by a distance a (cf. FIG. 9*d*). The difference in the lengths of the two springs corresponds to the predetermined spring travel a. As can be seen from the spring/travel diagram according to FIG. 9*d*, the second spring element is preloaded. For example, a driver element 8 which is mounted on the carrier tube 3 to a limited extent with respect to a guide groove 13 may be provided for this purpose. Preferably selected here are helical compression springs which have different diameters and are arranged concentrically to one another in cross section with respect to the carrier tube. In FIG. 9b, the first spring element 5 has been displaced in the x direction by a distance/spring travel a. In this position the first driver element 7 abuts against the second driver element 8. As FIG. 9c shows, the second spring element 6 can now also be compressed during a further displacement in the x direction.

The invention claimed is:

1. Explosion protection valve having a housing and having at least one movable closing body which is guided on a guide rod inside the housing and can be displaced from a predefined open position in at least one direction of movement into a sealing closed position in the event of a blast or suction wave,
   a spring arrangement comprising at least one spring pair which interacts with the closing body being provided for holding the open position on the guide rod, wherein said spring pair has at least a first spring element, a second spring element, a first driver element and a second driver element for acting upon said first and second spring element,
   wherein said first and second spring elements are arranged on the guide rod one after another, wherein the entire portions of each of the spring elements are completely separated from each other in the direction of movement such that they do not overlap,
   the spring elements and driver elements being arranged in such a way that, during a displacement of the closing body into the closed position, the second spring element cannot be acted upon via the second driver element until after a predetermined spring travel of the first spring element.

2. Explosion protection valve according to claim 1, characterized in that the closing body is displaceably arranged on the guide rod in such a way that only the first spring element can be acted upon via the first driver element within the predetermined spring travel and the second spring element can be additionally acted upon via the second driver element if the predetermined spring travel is exceeded.

3. Explosion protection valve according to claim 1, characterized in that the first driver element and the second driver element are arranged on the inside of a carrier tube, surrounding the guide rod.

4. Explosion protection valve according to claim 1, having a closing body displaceable in two directions of movement, wherein the spring arrangement comprises one spring pair for each direction of movement.

5. Explosion protection valve according to claim 4, wherein the second spring element of both spring pairs is one and the same.

6. Explosion protection valve according to claim 5, characterized in that the second spring element is arranged in between, approximately centrally in particular with respect to the guide rod.

7. Explosion protection valve according to claim 5, characterized in that the second spring element is held between two limiting means.

8. Explosion protection valve according to claim 7, characterized in that the limiting means for the second spring element are mounted on the guide rod in such a way as to be displaceable to a limited extent.

9. Explosion protection valve according to claim 7, characterized in that the limiting means each have a bush.

10. Explosion protection valve according to claim 7, characterized in that the limiting means for the second spring element are mounted on the guide rod in such a way as to be displaceable to a limited extent and that the limiting means each have a bush for the limited displacement of the limiting means, at least one guide groove running in the direction of movement is arranged on the guide rod, and pins connected to the respective bush engage in each case in said guide groove.

11. Explosion protection valve according to claim 5, characterized in that one spring pair is arranged for each direction of movement on one side of the guide rod.

12. Explosion protection valve according to claim 4, characterized in that one spring pair is arranged for each direction of movement on one side of the guide rod.

13. Explosion protection valve according to claim 1, characterized in that at least the second spring element is held in a preloaded position by limiting means.

14. Explosion protection valve according to claim 1, characterized in that the spring elements of the spring arrangement are designed as compression springs, in particular as helical compression springs.

15. Explosion protection valve according to claim 1, characterized in that the spring stiffness of the first spring element is equal to, greater than or less than the spring stiffness of the second spring element.

* * * * *